US012580615B2

(12) United States Patent
Huang et al.

(10) Patent No.: US 12,580,615 B2
(45) Date of Patent: Mar. 17, 2026

(54) SIGNAL PROCESSING METHOD AND RELATED APPARATUS

(71) Applicant: HUAWEI TECHNOLOGIES CO., LTD., Shenzhen (CN)

(72) Inventors: Dehua Huang, Dongguan (CN); Zhongliang Zheng, Dongguan (CN); Libiao Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/437,645

(22) Filed: Feb. 9, 2024

(65) Prior Publication Data

US 2024/0187056 A1      Jun. 6, 2024

Related U.S. Application Data

(63) Continuation of application No. PCT/CN2022/102119, filed on Jun. 29, 2022.

(30) Foreign Application Priority Data

Aug. 12, 2021      (CN) ......................... 202110925422.X

(51) Int. Cl.
*H04L 27/00*          (2006.01)
*H04B 7/06*          (2006.01)
(52) U.S. Cl.
CPC ..................................... *H04B 7/06* (2013.01)
(58) Field of Classification Search
CPC ...................................................... H04B 7/06
USPC ................................. 375/299, 295, 219, 316
See application file for complete search history.

(56) References Cited

U.S. PATENT DOCUMENTS

2013/0044650 A1 *  2/2013  Barker ................. H04B 7/0671
                                                              455/562.1
2016/0226142 A1 *  8/2016  Leroux .................... H01Q 3/38
2019/0229952 A1    7/2019  Sun et al.
2020/0021346 A1    1/2020  Xie et al.
                                    (Continued)

FOREIGN PATENT DOCUMENTS

CN          1921341 A        2/2007
CN          200950586 Y      9/2007
CN          106603129 A      4/2017

OTHER PUBLICATIONS

Extended European Search Report issued in corresponding European Application No. 22855101.6, dated Oct. 1, 2024, pp. 1-13.
                                    (Continued)

*Primary Examiner* — Zewdu A Kassa
(74) *Attorney, Agent, or Firm* — HAUPTMAN HAM, LLP

(57)                    ABSTRACT

Embodiments of this application disclose a signal processing method and a related apparatus, to increase a signal transmit power and a beam coverage area. The method in embodiments of this application includes: receiving a first signal from a radio-frequency channel, where the radio-frequency channel is separately connected to a first phase shifter and a second phase shifter, a destination antenna array of the first signal is an antenna array corresponding to the first phase shifter, the first phase shifter is a phase shifter with a dynamically adjusted phase, and the second phase shifter is a phase shifter with a fixed phase; and sending a first signal processed through a power bridge to the second phase shifter.

20 Claims, 6 Drawing Sheets

(56) References Cited

U.S. PATENT DOCUMENTS

2020/0358473 A1    11/2020   Chen et al.
2022/0200147 A1*   6/2022   Horn ...................... H04B 7/088

OTHER PUBLICATIONS

Chinese First Office Action issued in corresponding Chinese Application No. 202110925422.X, dated Jan. 24, 2025, pp. 1-9.
India Office Action issued in corresponding India Application No. 202417009584, dated Dec. 11, 2025, pp. 1-7.

* cited by examiner

Communication apparatus 700

Interface unit 701

Processing unit 702

SIGNAL PROCESSING METHOD AND RELATED APPARATUS

CROSS-REFERENCE TO RELATED APPLICATIONS

This application is a continuation of International Application No. PCT/CN2022/102119, filed on Jun. 29, 2022, which claims priority to Chinese Patent Application No.202110925422.X, filed on Aug. 12, 2021. The disclosures of the aforementioned applications are hereby incorporated by reference in their entireties.

TECHNICAL FIELD

Embodiments of this application relate to the communication field, and in particular, to a signal processing method and a related apparatus.

BACKGROUND

In a communication system, beamforming (beamforming, BF) can concentrate transmit energy in a specific direction, so that a transmit power in one direction may be increased while a transmit power in another direction is close to zero, thereby extending a communication distance in an expected direction and avoiding interference to another direction. The beamforming includes digital beamforming (digital beamforming, DBF), analog beamforming (analog beamforming, ABF), and hybrid beamforming (hybrid digital and analog beamforming, HBF).

In an HBF architecture, because a common channel and a traffic channel are controlled by a same phase shifter, when an antenna weight of the traffic channel is adjusted to change a beam direction, a beam direction of the common channel also changes accordingly. To ensure optimal performance of the traffic channel, the antenna weight needs to be adjusted frequently. The frequent adjustment of the antenna weight causes frequent changes and fluctuations of a transmit beam of the common channel. The common channel is mainly used by a terminal device to perform cell measurement and channel estimation, and the beam needs to be kept stable.

In a conventional technology, to keep the transmit beam of the common channel stable, a base station sends a signal of the common channel only to a radio-frequency channel corresponding to a group of antenna arrays that is of a phase shifter and that has a fixed phase. In other words, the common channel uses only some radio-frequency channels of a cell. Although the signal transmit beam of the common channel is stable, a total transmit power of the common channel is merely a sum of powers of the some radio-frequency channels, resulting in a decrease in a signal transmit power and a coverage area of the common channel.

SUMMARY

Embodiments of this application provide a signal processing method and a related apparatus, to increase a signal transmit power and a beam coverage area.

A first aspect of embodiments of this application provides a signal processing method. The method is performed by a base station, or may be performed by a component of the base station, for example, a processor, a chip, or a chip system of the base station, or may be implemented by a logical module or software that can implement all or some of server functions. The method provided in the first aspect includes: receiving a first signal from a radio-frequency channel, where the first signal is sent by a signal source through the radio-frequency channel, the radio-frequency channel is separately connected to a first phase shifter and a second phase shifter through a baseband module and a power bridge, the first phase shifter is a phase shifter with a dynamically adjustable phase, the second phase shifter is a phase shifter with a fixed phase, and a destination antenna array of the first signal is an antenna array corresponding to the first phase shifter, that is, the first signal is originally a signal of the first phase shifter: and sending, by the base station, a first signal processed through the power bridge to the second phase shifter.

In embodiments of this application, the power bridge is introduced to the base station, and a bridge parameter of the power bridge and baseband weights of different channels are designed, so that signals of the different channels are weighted through the baseband weights and then sent to a specified phase shifter after passing through the power bridge. In other words, a signal originally sent to the phase shifter with the dynamically adjustable phase may be aggregated to a radio-frequency channel of the phase shifter with a fixed phase. In this way, a signal fluctuation is reduced, and at the same time, a signal transmit power is not reduced, and a beam coverage area does not shrink.

Based on the first aspect, in a possible implementation, the base station receives a second signal from the radio-frequency channel, where a destination antenna array of the second channel is an antenna array corresponding to the second phase shifter. The first signal and the second signal are processed through the power bridge. The first signal and the second signal may be signals of different radio-frequency channels that are simultaneously received by the base station.

In embodiments of this application, the base station sends, through the power bridge, the first signal originally sent to the phase shifter with the dynamically adjustable phase to the phase shifter with a fixed phase. In comparison with a solution in which only the second signal is sent to the phase shifter with a fixed phase, and the first signal is not sent to the phase shifter with the dynamically adjustable phase, a transmit power of the antenna array is increased, and the beam coverage area is increased.

Based on the first aspect, in a possible implementation, that the first signal and the second signal are processed through the power bridge includes superimposing the first signal onto the second signal through the power bridge.

In embodiments of this application, a power of the first signal may be superimposed onto a power of the second signal through the power bridge, thereby increasing the signal transmit power of the antenna array of the base station.

Based on the first aspect, in a possible implementation, the superimposing the first signal onto the second signal through the power bridge includes superimposing the first signal onto the second signal based on a baseband weight of the radio-frequency channel and a power bridge parameter of the power bridge.

In embodiments of this application, the base station may design the bridge parameter of the power bridge, to send the power of the first signal superimposed with the power of the second signal to the phase shifter with a fixed phase, thereby improving solution implementability.

Based on the first aspect, in a possible implementation, the radio-frequency channel includes a common channel and a traffic channel. The first signal may be a radio-frequency signal of the common channel, or may be a radio-frequency signal of the traffic channel. Baseband weights of the common channel and the traffic channel may be the same or different.

For the common channel, the common channel is mapped to all radio-frequency channels in a baseband, and is sent after being weighted by using a corresponding baseband weight of the common channel. For a radio-frequency channel originally connected to the antenna array that is of the phase shifter and that has a fixed phase, after passing through the power bridge, the second signal sent by the radio-frequency channel is still sent to the corresponding antenna array that is of the phase shifter and that has a fixed phase. For a radio-frequency channel originally connected to the antenna array that is of the phase shifter and whose phase can be dynamically adjusted, after passing through the power bridge, the first signal sent by the radio-frequency channel is aggregated to the antenna array that is of the phase shifter and that has a fixed phase and is superimposed onto the second signal, for sending. In other words, a signal power of the common channel received by the antenna array that is of the phase shifter and that has a fixed phase is doubled, and the antenna array that is of the phase shifter and whose phase can be dynamically adjusted does not send a signal of the common channel.

For the traffic channel, the traffic channel is mapped to all the radio-frequency channels in the baseband, and is sent after being weighted by using a corresponding baseband weight of the traffic channel. A second signal that arrives at the corresponding antenna array that is of the phase shifter and that has a fixed phase after passing through the power bridge, and a first signal that arrives at the corresponding antenna array that is of the phase shifter and whose phase can be dynamically adjusted after passing through the power bridge is consistent with a traffic channel signal that arrives at a corresponding antenna array when the power bridge and the corresponding baseband weight are not used for weighting.

In embodiments of this application, the base station may design the bridge parameter and the baseband weight based on transmission requirements of the signal of the common channel and the signal of the traffic channel, to improve solution applicability.

A second aspect of embodiments of this application provides a base station, where the base station includes an interface unit and a processing unit.

The interface unit is configured to receive a first signal from a radio-frequency channel. The radio-frequency channel is separately connected to a first phase shifter and a second phase shifter. A destination antenna array of the first signal is an antenna array corresponding to the first phase shifter. The first phase shifter is a phase shifter with a dynamically adjustable phase, and the second phase shifter is a phase shifter with a fixed phase.

The processing unit is configured to send a first signal processed through a power bridge to the second phase shifter.

Based on the second aspect, in a possible implementation, the interface unit is further configured to receive a second signal from the radio-frequency channel, where a destination antenna array of the second channel is an antenna array corresponding to the second phase shifter.

The processing unit is specifically configured to process the first signal and the second signal through the power bridge.

Based on the second aspect, in a possible implementation, the processing unit is specifically configured to superimpose the first signal onto the second signal through the power bridge.

Based on the second aspect, in a possible implementation, the processing unit is specifically configured to superimpose the first signal onto the second signal based on a baseband weight of the radio-frequency channel and a power bridge parameter of the power bridge.

Based on the second aspect, in a possible implementation, the radio-frequency channel includes a common channel and a traffic channel.

A third aspect of embodiments of this application provides a communication apparatus, including a processor. The processor is coupled to a memory. The processor is configured to store instructions, and when the instructions are executed by the processor, the communication apparatus is enabled to perform the method according to any one of the first aspect or the possible implementations of the first aspect.

A fourth aspect of embodiments of this application provides a computer-readable storage medium. The computer-readable storage medium stores instructions, and when the instructions are executed, a computer is enabled to perform the method according to any one of the first aspect or the possible implementations of the first aspect.

A fifth aspect of embodiments of this application provides a computer program product. The computer program product includes instructions, and when the instructions are executed, a computer is enabled to implement the method according to any one of the first aspect or the possible implementations of the first aspect.

It may be understood that, for beneficial effects that can be achieved by any communication apparatus, computer-readable medium, computer program product, or the like provided above, refer to beneficial effects in the corresponding method. Details are not described herein again.

DESCRIPTION OF EMBODIMENTS

Figure 1:
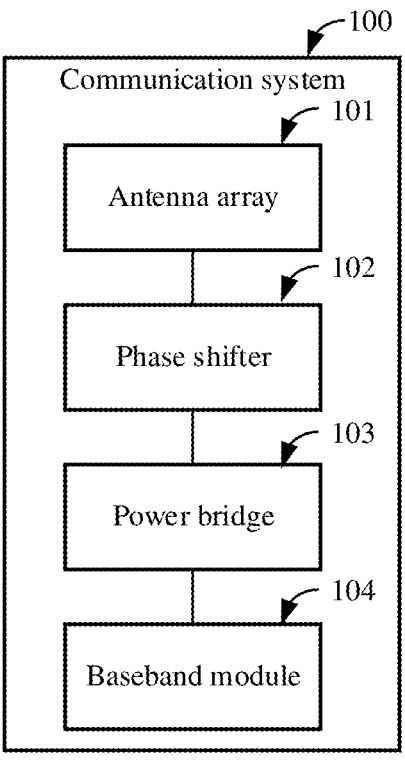
FIG. 1 is a schematic diagram of an architecture of a communication system according to an embodiment of this application.

Embodiments of this application provide a signal processing method and a related apparatus, to increase a transmit power and a coverage area of a signal.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances, so that embodiments described herein can be implemented in other orders than the order illustrated or described herein. In addition, the terms "include", "have" and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device.

In embodiments of this application, the term "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a related concept in a specific manner.

In the following, some terms in this application are described, to help a person skilled in the art have a better understanding.

Beamforming (beamforming, BF) is a signal pre-processing technology that is based on an antenna array. A parameter of a basic unit of a phase array is adjusted, so that signals at some angles are constructively interfered and signals at some other angles are destructively interfered.

Digital beamforming (digital beamforming, DBF) means that when mapping original transmit data to a radio-frequency channel, a baseband superimposes different weights on different radio-frequency channels, to finally form different transmit beams through the antenna array.

Analog beamforming (analog beamforming, ABF) means that independent numerical control phase shifters are added to different array units in the antenna array. The phase shifter is configured to control a phase difference generated when a same signal arrives at different array units, to control a shape of a transmit beam finally formed by a plurality of array units. If phases configured by the phase shifter are different, transmit beams of the antenna array are different.

Hybrid beamforming (hybrid digital and analog beamforming, HBF) refers to beamforming that uses both the digital beamforming and the analog beamforming.

The following describes a signal processing method and a related apparatus provided in embodiments of this application with reference to the accompanying drawings.

FIG. 1 is a schematic diagram of an architecture of a communication system to which a signal processing method is applied according to an embodiment of this application. As shown in FIG. 1, the communication system 100 includes an antenna array 101, a phase shifter 102, a power bridge 103, and a baseband module 104. The antenna array 101 includes a plurality of same single antennas that are arranged according to a specific rule, and the antenna array 101 is configured to send a radio-frequency signal to a terminal.

The phase shifter 102 is configured to perform analog beamforming. The phase shifter 102 is configured to control a phase difference of same signals arriving at different antenna array units, to control a shape of a transmit beam finally formed by a plurality of antenna array units. If phases configured by the phase shifter are different, transmit beams of the antenna array are different. Phase shifter phases configured for the different antenna array units in analog beamforming are referred to as antenna weights.

The power bridge 103 is configured to send different channel signals weighted through a baseband weight to a specified phase shifter. The baseband module 104 is configured to perform digital beamforming. The baseband module 104 is configured to: when mapping, to a radio-frequency channel, a signal sent by a signal source, the baseband module 104 superimposes different weights on different radio-frequency channels. In digital beamforming, weights superimposed by a baseband on different radio-frequency channels are referred to as baseband weights, and finally different transmit beams are formed through the antenna array.

Figure 2:
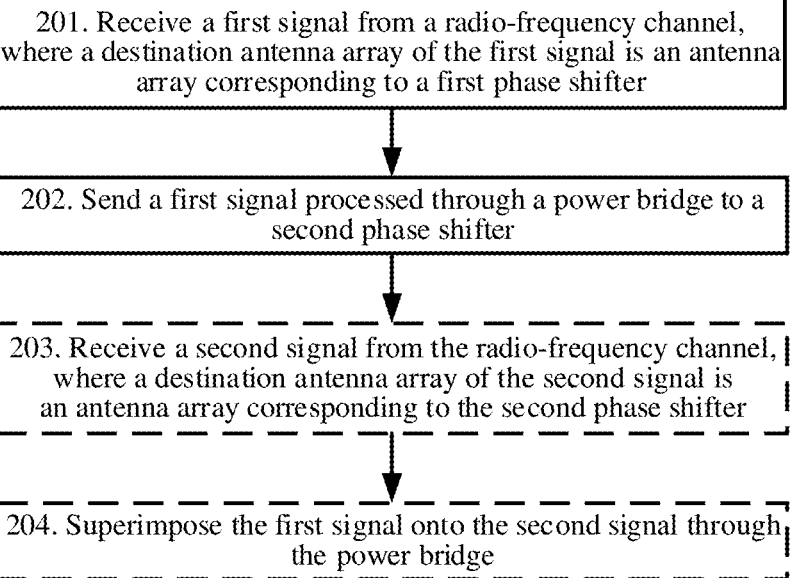
FIG. 2 is a schematic flowchart of a signal processing method according to an embodiment of this application.

FIG. 2 is a schematic flowchart of a signal processing method according to an embodiment of this application. A procedure of the signal processing method includes the following steps.

201. A base station receives a first signal from a radio-frequency channel, where a destination antenna array of the first signal is an antenna array corresponding to a first phase shifter.

The base station receives the first signal from the radio-frequency channel. The radio-frequency channel is separately connected to the first phase shifter and a second phase shifter through a baseband module and a power bridge. The first phase shifter is a phase shifter with a dynamically adjustable phase, and the second phase shifter is a phase shifter with a fixed phase.

Antenna arrays in embodiments of this application are divided into two groups. A phase shifter corresponding to one group of antenna arrays is the phase shifter with a fixed phase, and a phase shifter corresponding to the other group of antenna arrays is the phase shifter whose phase can be dynamically adjusted. The destination antenna array of the first signal is the antenna array corresponding to the first phase shifter.

In embodiments of this application, the radio-frequency channel includes a common channel and a traffic channel. The common channel is mainly used by a terminal device to perform cell measurement or signal estimation. The common channel is, for example, a transmission channel of a cell-specific reference signal (cell-specific reference signal, CRS) or a transmission channel of a synchronization signal and a physical broadcast channel block (synchronization signal and PBCH block, PBCH). The traffic channel is, for example, a physical downlink shared channel (physical downlink shared channel, PDSCH) for transmitting service data.

When a signal received by the base station is a signal of the common channel, the signal is mapped to all antenna arrays. The antenna arrays include the antenna array corresponding to the first phase shifter and an array corresponding to the second phase shifter. A signal mapped to the antenna array corresponding to the first phase shifter is the first signal, and a signal mapped to the antenna array corresponding to the second phase shifter is a second signal.

Figure 3:
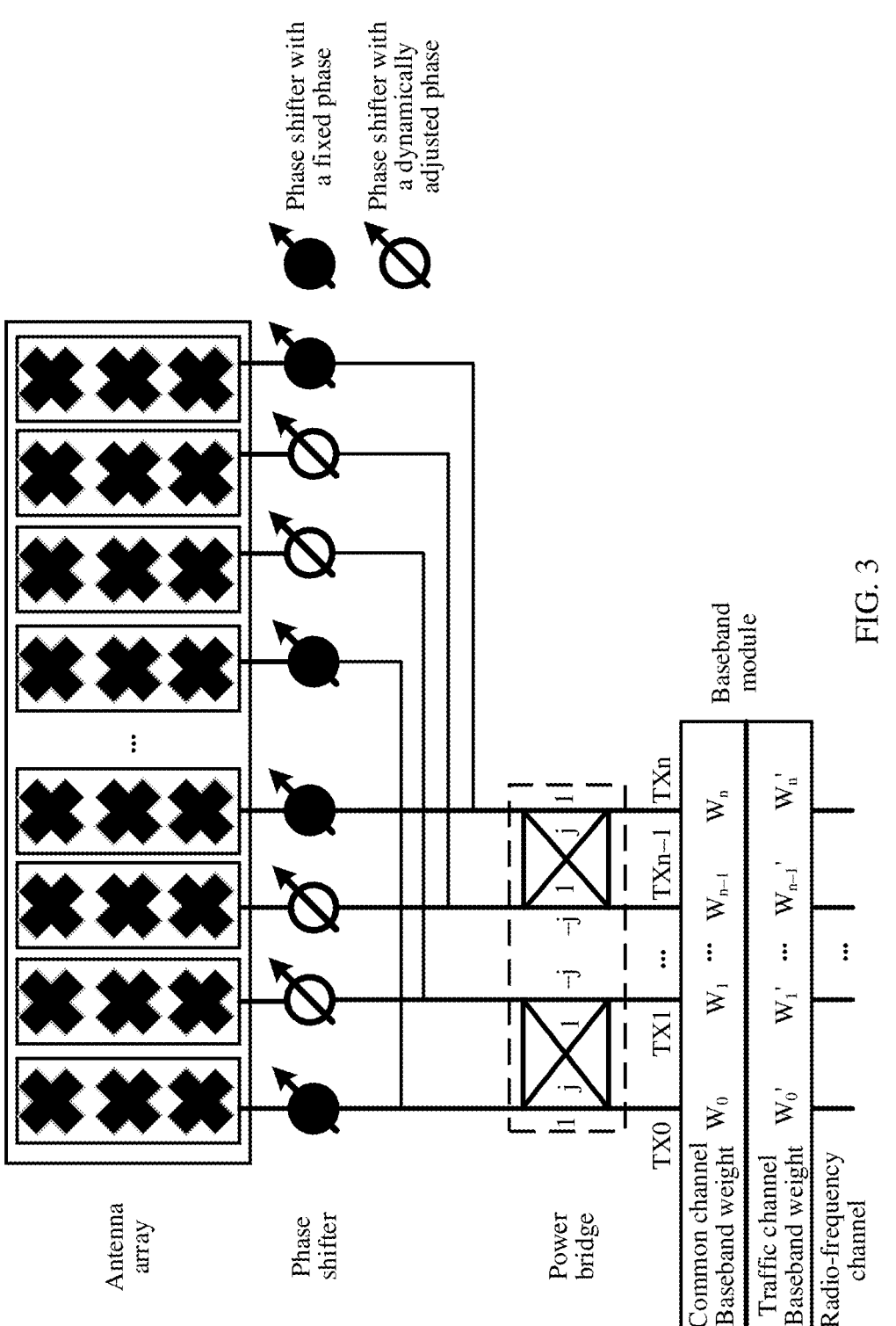
FIG. 3 is a schematic diagram of another signal processing method according to an embodiment of this application.

FIG. 3 is a schematic diagram of a base station system according to an embodiment of this application. In an example shown in FIG. 3, the antenna arrays are divided into two groups. One group of antenna arrays is connected to the phase shifter with a fixed phase, and the other group of antenna arrays is connected to the phase shifter with the dynamically adjustable phase. The base station receives a signal sent by a signal source through the radio-frequency channel, where the signal is separately sent to antenna arrays corresponding to different phase shifters through the baseband module and the power bridge. The signal includes the first signal and the second signal, where the destination antenna array of the first signal is the antenna array corresponding to the phase shifter with the dynamically adjustable phase, and a destination antenna array of the second signal is the antenna array corresponding to the phase shifter with a fixed phase.

202. The base station sends a first signal processed through the power bridge to the second phase shifter.

The base station sends the first signal processed through the power bridge to the second phase shifter. In other words, the original destination antenna array of the first signal is the antenna array corresponding to the first phase shifter. After the first signal is processed through the power bridge, the destination antenna array of the first signal is adjusted from the antenna array corresponding to the first phase shifter to the antenna array corresponding to the second phase shifter. Specifically, the base station designs a bridge parameter and a baseband weight, so that a power of the first signal of the radio-frequency channel originally corresponding to the first phase shifter is zero, and the power of the first signal is aggregated to a radio-frequency channel corresponding to the second phase shifter.

FIG. 3 is a schematic diagram of a base station system according to an embodiment of this application. In an example shown in FIG. 3, the base station receives the first signal sent by the signal source through the radio-frequency channel, where the destination antenna array of the first signal is the antenna array corresponding to the phase shifter with the dynamically adjustable phase. The base station sends the first signal processed through the power bridge to the phase shifter with a fixed phase. Specifically, the base station designs the baseband weight and the bridge parameter, the power of the first signal that passes through the power bridge is aggregated to the radio-frequency channel of the phase shifter with a fixed phase, so that the power of the first signal in the radio-frequency channel of the phase shifter with the dynamically adjustable phase is zero. The first signal may be a radio-frequency signal of the common channel, or may be a radio-frequency signal of the traffic channel. Baseband weights of the common channel and the traffic channel may be the same or different. For example, in FIG. 3, the baseband weight of the common channel is $W_0$, $W_1$, . . . , $W_{n-2}$, and $W_{n-1}$, and the baseband weight of the traffic channel is $W'_0$, $W'_1$, . . . , $W'_{n-2}$, and $W'_{n-1}$.

203. The base station receives the second signal from the radio-frequency channel, where the destination antenna array of the second signal is the antenna array corresponding to the second phase shifter.

The base station receives the second signal from the radio-frequency channel, where the destination antenna array of the second signal is the antenna array corresponding to the second phase shifter. For the second signal whose destination antenna array is the antenna array of the second phase shifter, after passing through the power bridge, the second signal is still sent to the antenna array corresponding to the second phase shifter through the radio-frequency channel connected to the second phase shifter.

FIG. 3 is a schematic diagram of a base station system according to an embodiment of this application. In an example shown in FIG. 3, the base station receives the signal sent by the signal source through the radio-frequency channel, where the signal is separately sent to the antenna arrays corresponding to the different phase shifters through the baseband module and the power bridge. The signal includes the first signal and the second signal, where the destination antenna array of the first signal is the antenna array corresponding to the phase shifter with the dynamically adjustable phase, and the destination antenna array of the second signal is the antenna array corresponding to the phase shifter with a fixed phase.

204. The base station superimposes the first signal onto the second signal through the power bridge.

The base station superimposes the first signal onto the second signal through the power bridge. Specifically, the base station superimposes the first signal onto the second signal based on the baseband weight and the bridge parameter of the power bridge. For the first signal whose destination antenna array is the antenna array corresponding to the first phase shifter, after being processed through the power bridge, the first signal is aggregated to the antenna array corresponding to the second phase shifter, and is superimposed onto the second signal whose destination antenna array is the antenna array corresponding to the second phase shifter, for sending. In other words, a power of a signal received by the antenna array corresponding to the second phase shifter is doubled, and the antenna array corresponding to the first phase shifter does not send the first signal.

Figure 4:
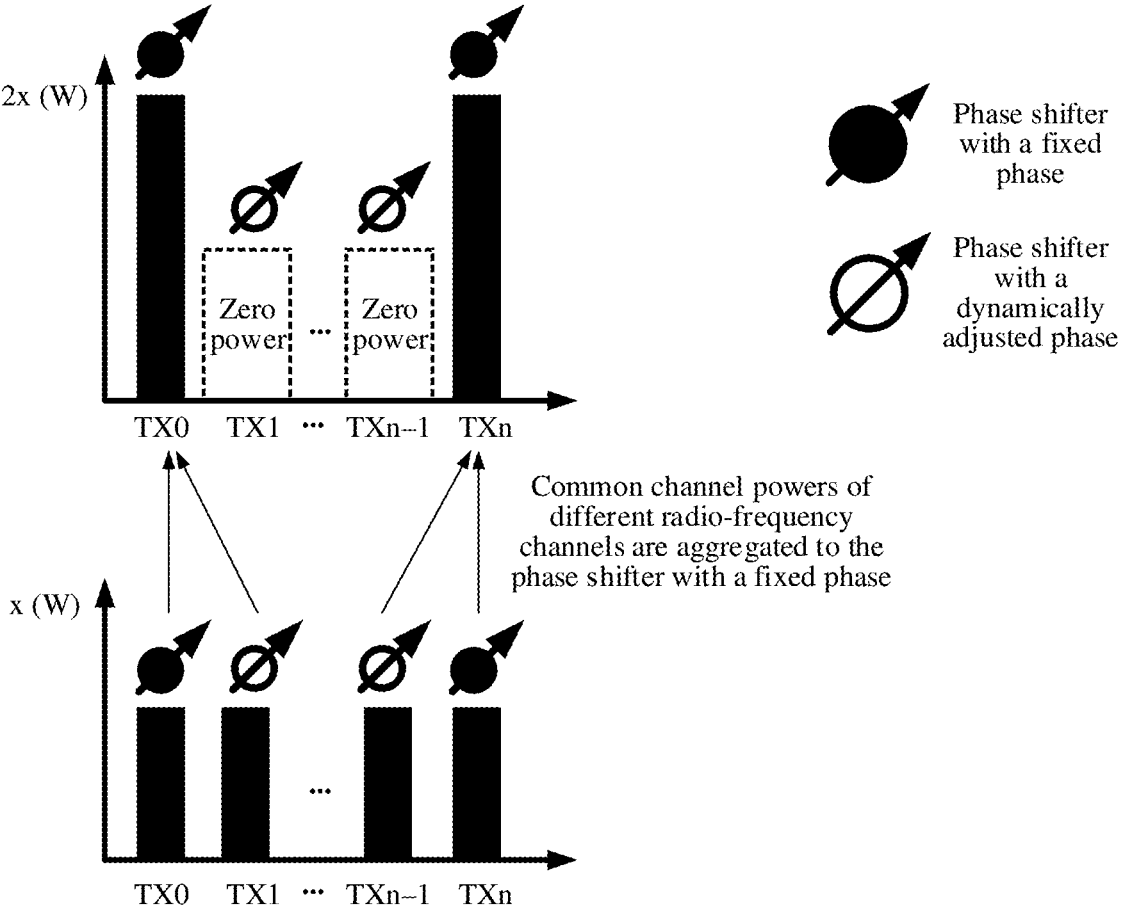
FIG. 4 is a schematic diagram of another signal processing method according to an embodiment of this application.

The following describes a signal processing method provided in an embodiment of this application with reference to FIG. 4. FIG. 4 is a schematic diagram of a power change of a signal processing method according to an embodiment of this application. In an example shown in FIG. 4, a base station sends a first signal processed through a power bridge to a second phase shifter, so that a power of the first signal is superimposed onto a power of a second signal.

As shown in FIG. 4, a power of a signal on a radio-frequency channel TX0 to a radio-frequency channel TXn is x. Phase shifters connected to the radio-frequency channel TX0 and the radio-frequency channel TXn are phase shifters with a fixed phase, and signals on the radio-frequency channel TX0 and the radio-frequency channel TXn are second signals. Phase shifters connected to a radio-frequency channel TX1 and a radio-frequency channel TXn−1 are phase shifters with dynamically adjustable phases, and signals on the radio-frequency channel TX1 and the radio-frequency channel TXn−1 are first signals. After being processed through the power bridge, the signal on the radio-frequency channel TX1 is aggregated to the radio-frequency channel TX0, and the signal on the radio-frequency channel TXn−1 is aggregated to the radio-frequency channel TXn. To be specific, the base station superimposes the first signal onto the second signal through the power bridge. After the superimposition, a signal power on the radio-frequency channel TX0 and the radio-frequency channel TXn is 2*x, and a signal power on the radio-frequency channel TX1 and the radio-frequency channel TXn−1 is 0.

Figure 5:
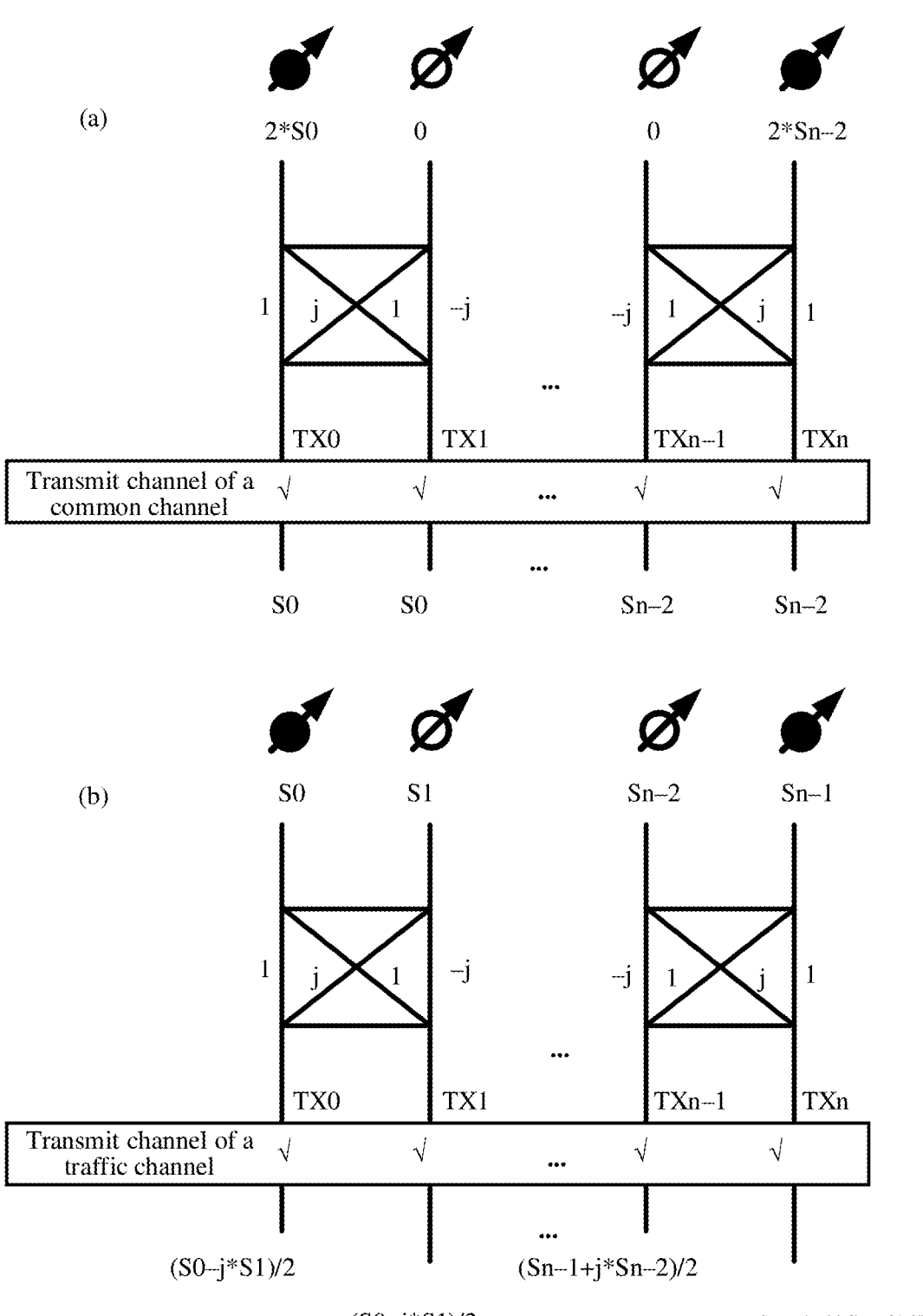
FIG. 5 is a schematic diagram of a power of a radio-frequency channel according to an embodiment of this application.

FIG. 5 is a schematic diagram of processing a signal of a radio-frequency channel based on a baseband weight and a bridge parameter by a base station according to an embodiment of this application. As shown in FIG. 5, (a) is a schematic diagram of signal processing of a common channel, and (b) is a schematic diagram of signal processing of a traffic channel. In an embodiment in (a) , it is assumed that signals on a common channel TX0 and a common channel TX1 are both S0, and signals on a common channel TXn−1 and a common channel TXn are both Sn−2. The common channel TX0 and the common channel TXn are connected to phase shifters with a fixed phase, and the common channel TX1 and the common channel TXn−1 are connected to phase shifters with dynamically adjustable phases. After being processed through the power bridge, a signal on the common channel TX0 is 2*S0, a signal on the common channel TXn are 2*Sn−2, and signals on the common channel TX1 and the common channel TXn−1 are 0.

In an example shown in (b), it is assumed that a signal on a traffic channel TX0 is (S0−j*S1)/2, a signal on a traffic channel TX1 is (S0+j*S1)/2, a signal on a traffic channel TXn−1 is (Sn−1+j*Sn−2)/2, and a signal on a traffic channel TXn is (Sn−1−j*Sn−2)/2. The traffic channel TX0 and the traffic channel TXn are connected to phase shifters with a fixed phase, and the traffic channel TX1 and the traffic channel TXn−1 are connected to phase shifters with dynamically adjustable phases. After being processed through the power bridge, the signal on the traffic channel TX0 is S0, the signal on the traffic channel TX1 is S1, the signal on the traffic channel TXn−1 is Sn−2, and the signal on the traffic channel TXn is Sn−1.

Figures 6, 7:
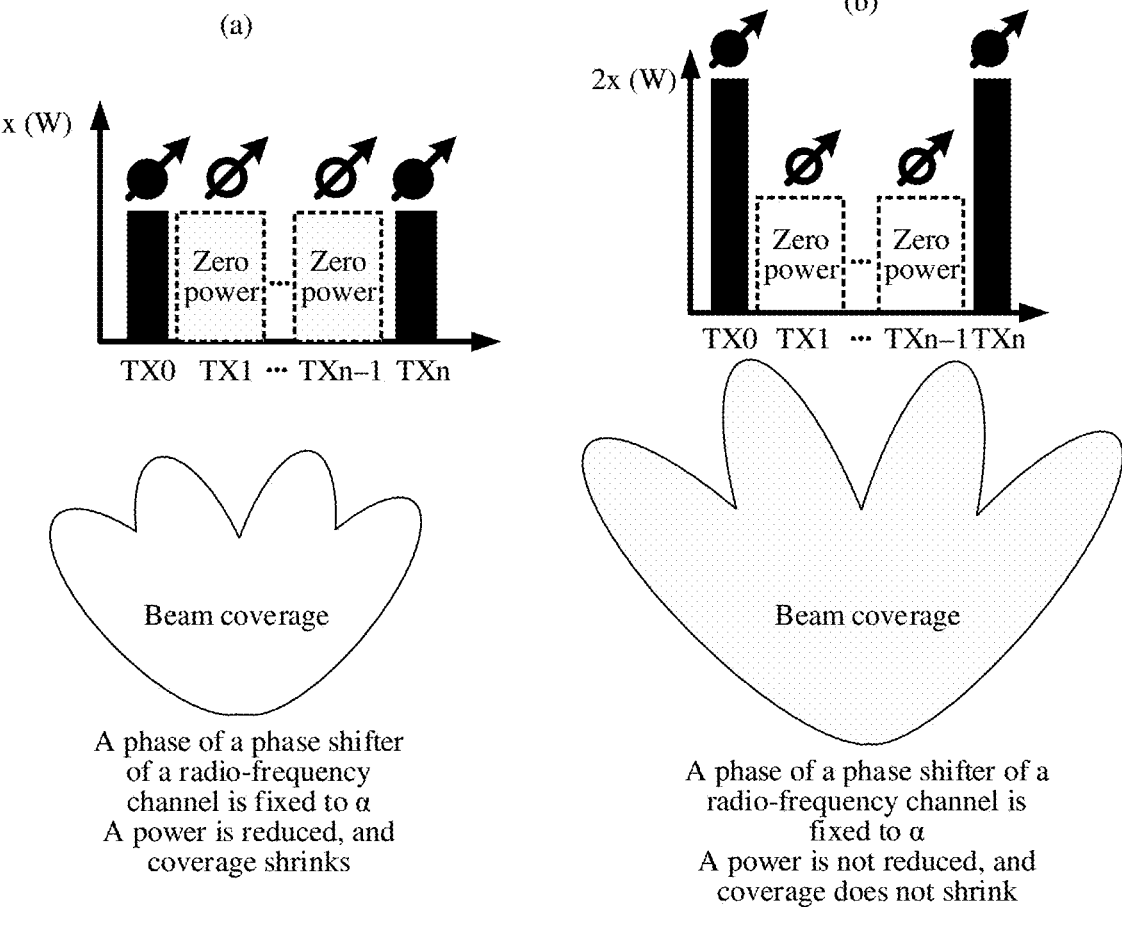
FIG. 6 is a schematic diagram of beam coverage according to an embodiment of this application.
FIG. 7 is a schematic diagram of a structure of a communication apparatus according to an embodiment of this application.

FIG. 6 is a schematic diagram of comparison of beam coverage according to an embodiment of this application. As shown in FIG. 6, (a) is a schematic diagram of powers of different radio-frequency channels and a schematic diagram of a beam coverage area before a power bridge is introduced. Although a signal is sent through the radio-frequency channel of the phase shifter with a fixed phase, a power of the signal is not superimposed on the radio-frequency channel of the phase shifter with a fixed phase, so that the power of the signal is reduced, and the beam coverage area shrinks.

As shown in FIG. 6, (b) is a schematic diagram of powers of different radio-frequency channels and a schematic diagram of a beam coverage area after a power bridge is introduced. After being processed through the power bridge, a signal is sent through the radio-frequency channel of the phase shifter with a fixed phase. A power of a signal originally sent to the phase shifter with the dynamically adjustable phase is superimposed onto a power of a signal originally sent to the phase shifter with a fixed phase, so that a power of the sent signal is not reduced, and the beam coverage area does not shrink.

In an example shown in FIG. 6, an example in which a synchronization signal block (SSB) is sent on a new radio (NR) common channel is used. If the SSB is sent on all radio-frequency channels, a shape of a transmit beam of the SSB dynamically changes with a phase of a phase shifter, and a synchronization signal and a broadcast signal of an NR cell fluctuate greatly. Therefore, an access success rate of a user in the NR cell, especially a cell edge user, is reduced. To resolve the foregoing problem, the SSB on the NR common channel is sent only on the radio-frequency channel that is of the phase shifter and that has a fixed phase. Although the transmit beam of the SSB in NR is fixed, a quantity of transmit channels is reduced by half, and a total transmit power is reduced by half. Therefore, a coverage area of the NR cell shrinks.

In this embodiment of this application, the SSB on the NR common channel is also sent on all the radio-frequency channels, and the total transmit power of the SSB on the NR common channel is the same. However, after passing through the power bridge, the SSB is aggregated to an antenna array that is of the phase shifter and that has a fixed phase, for sending. Therefore, the transmit beam is stable, thereby increasing the access success rate of the cell user. In this embodiment of this application, because the SSB is sent on all the radio-frequency channels, in comparison with a solution in which the SSB is sent only on the radio-frequency channel that is of the phase shifter and that has a fixed phase, the quantity of transmit radio-frequency channels of the SSB is doubled. In other words, the total transmit power of the SSB is doubled, thereby increasing the coverage area of the cell.

The foregoing describes the signal processing methods provided in embodiments of this application. The following describes a related apparatus in embodiments of this application with reference to the accompanying drawings.

FIG. 7 is a schematic diagram of a structure of a communication apparatus according to an embodiment of this application. The communication apparatus is configured to implement steps corresponding to the base station in the foregoing embodiments. As shown in FIG. 7, the communication apparatus 700 includes an interface unit 701 and a processing unit 702.

The interface unit 701 is configured to receive a first signal from a radio-frequency channel, where the radio-frequency channel is separately connected to a first phase shifter and a second phase shifter. A destination antenna array of the first signal is an antenna array corresponding to the first phase shifter. The first phase shifter is a phase shifter with a dynamically adjustable phase, and the second phase shifter is a phase shifter with a fixed phase.

The processing unit 702 is configured to send a first signal processed through a power bridge to the second phase shifter.

Based on the second aspect, in a possible implementation, the interface unit 701 is further configured to receive a second signal from the radio-frequency channel, where a destination antenna array of the second channel is an antenna array corresponding to the second phase shifter.

The processing unit 702 is specifically configured to process the first signal and the second signal through the power bridge.

Based on the second aspect, in a possible implementation, the processing unit 702 is specifically configured to superimpose the first signal onto the second signal through the power bridge.

Based on the second aspect, in a possible implementation, the processing unit 702 is specifically configured to superimpose the first signal onto the second signal based on a baseband weight of the radio-frequency channel and a power bridge parameter of the power bridge.

Based on the second aspect, in a possible implementation, the radio-frequency channel includes a common channel and a traffic channel.

It should be understood that division of the units in the foregoing apparatus is merely logical function division. During actual implementation, all or some of the units may be integrated into one physical entity, or may be physically separated. In addition, all of the units in the apparatus may be implemented in a form of software invoked by a processing element, or may be implemented in a form of hardware: or some of the units may be implemented in a form of software invoked by a processing element, and some of the units may be implemented in a form of hardware. For example, each unit may be a separately disposed processing element, or may be integrated into a chip of the apparatus for implementation. In addition, each unit may be stored in a memory in a form of a program, and invoked by a processing element of the apparatus to perform a function of the unit. In addition, all or some of the units may be integrated together, or may be independently implemented. The processing element described herein may also be referred to as a processor, and may be an integrated circuit that has a signal processing capability. During implementation, steps in the foregoing methods or the foregoing units may be implemented through a hardware integrated logic circuit in a processor element, or may be implemented in a form of software invoked by a processing element.

In an example, the unit in any one of the foregoing apparatuses may be one or more integrated circuits configured to implement the foregoing methods, for example, one or more application-specific integrated circuits (application-specific integrated circuits, ASICs), or one or more microprocessors (digital signal processors, DSPs), or one or more field programmable gate arrays (field programmable gate arrays, FPGAs), or a combination of at least two of these integrated circuit forms. For another example, when the unit in the apparatus is implemented in a form of scheduling a program by the processing element, the processing element may be a general-purpose processor, for example, a central processing unit (central processing unit, CPU) or another processor that may invoke the program. For another example, the units may be integrated and implemented in a form of a system-on-a-chip (system-on-a-chip, SOC).

Figure 8:
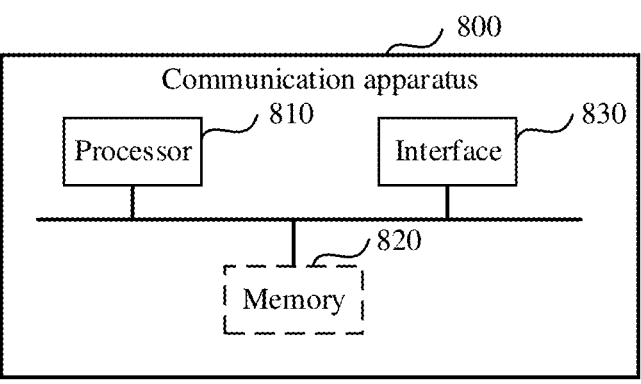
FIG. 8 is a schematic diagram of a structure of another communication apparatus according to an embodiment of this application.

FIG. 8 is a schematic diagram of a communication apparatus according to an embodiment of this application. The communication apparatus is configured to implement operations of the base station in the foregoing embodiments. As shown in FIG. 8, the communication apparatus includes a processor 810 and an interface 830. The processor 810 is coupled to the interface 830. The interface 830 is configured to communicate with another device. The interface 830 may be a transceiver or an input/output interface. The interface 830 may be, for example, an interface circuit. Optionally, the communication apparatus further includes a memory 820, configured to store instructions executed by the processor 810, or store input data needed by the processor 810 to run the instructions, or store data generated after the processor 810 runs the instructions.

A method performed by the base station in the foregoing embodiments may be implemented by the processor 810 by invoking a program stored in a memory (which may be the memory 820 in the base station, or may be an external memory). In other words, the base station may include the processor 810. The processor 810 invokes the program in the memory to perform the method performed by the base station in the foregoing method embodiments. The processor herein may be an integrated circuit that has a signal processing capability, for example, a CPU. The base station may be implemented by one or more integrated circuits configured to implement the foregoing methods, for example, one or more ASICs, one or more microprocessors DSPs, one or more FPGAs, or a combination of at least two of these integrated circuit forms. Alternatively, the foregoing implementations may be combined.

Specifically, a function/implementation process of the interface unit 701 and the processing unit 702 in FIG. 7 may be implemented by the processor 810 in the communication apparatus 800 shown in FIG. 8 by invoking computer-executable instructions stored in the memory 820.

In another embodiment of this application, a computer-readable storage medium is further provided. The computer-readable storage medium stores computer-executable instructions. When a processor of a device executes the computer-executable instructions, the device performs a method performed by the base station in the foregoing method embodiments.

In another embodiment of this application, a computer program product is further provided. The computer program product includes computer-executable instructions, and the computer-executable instructions are stored in a computer-readable storage medium. When a processor of a device executes the computer-executable instructions, the device performs a method performed by the base station in the foregoing method embodiments.

It may be clearly understood by a person skilled in the art that, for convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to conventional technologies, or all or some of the technical solutions may be implemented in a form of a software product. The computer software product is stored in a storage medium and includes several instructions for enabling a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

What is claimed is:

1. A device for transporting a person, comprising two blades extending along a longitudinal axis between two ends and each comprising two edges, and two longitudinal ends,
the blades being configured to be assembled to each other in a reversible manner in an assembly position by at least one coupling between two juxtaposed edges, parallel to the longitudinal axis, in order to form a support surface on which a person can be transported, the support surface having two longitudinal ends formed by the juxtaposition of the longitudinal ends of each blade, and two lateral edges,
the device further comprising removable means, called locking means, for locking said assembly position, each of said locking means being able to be reversibly secured at their ends to the longitudinal ends of the two blades at the two lateral edges of said support surface, and able to form a locking of the blades in the assembly position, each of said locking means having a gripping portion separated from said support surface by a space, when said locking means are secured and/or locked on said support surface, so that said gripping portion of the locking means and said space together form gripping means protruding and extending beyond the support surface in the same plane as the support surface, allowing to carry said device for transporting a person, said two blades comprising at their longitudinal ends at their juxtaposed edges at least one additional fastening means for fastening the locking means to said two blades, said additional fastening means being formed by the assembling of the two blades in the assembly position, the locking means having between its two ends a central portion which is configured to be forcibly introduced into said additional fastening means in addition to the securing of the two ends of said locking means to the longitudinal ends of the two blades at the two lateral edges of said support surface, said gripping portion being located between said central portion and the two ends of said locking means, said introduction of the locking means into the additional fastening means stiffening both the assembly of the two blades forming the support surface and the gripping means protruding and extending beyond said support surface.

2. The method according to claim 1, wherein the processing the first signal and the second signal through the power bridge comprises:

superimposing the first signal onto the second signal through the power bridge.

3. The method according to claim 2, wherein the superimposing the first signal onto the second signal through the power bridge comprises:

superimposing the first signal onto the second signal based on a baseband weight of the radio-frequency channel and a power bridge parameter of the power bridge.

4. The method according to claim 1, wherein the radio-frequency channel comprises one of a common channel and a traffic channel.

5. The method according to claim 2, wherein the superimposing the first signal onto the second signal through the power bridge is performed so that a power of the first signal processed through the power bridge is aggregated to the radio-frequency channel of the second phase shifter.

6. The method according to claim 2, wherein the superimposing the first signal onto the second signal through the power bridge is performed so that a power of the first signal processed through the power bridge is aggregated to the radio-frequency channel of the second phase shifter, and a power of the first signal in the radio-frequency channel of the first phase shifter is zero.

7. A method for assembling a person transportation device according to claim 1, wherein it comprises the following steps:

Placing successively each of the two blades on either side of the person lying on the ground, Assembling the two blades under the person in the assembly position at the coupling of the two blades, in order to form a support surface under said person and to form additional fastening means at the juxtaposed edges of the two blades at their longitudinal ends, Securing then locking the ends of each locking means to the two longitudinal ends of the two blades at the two lateral edges of said support surface, said locking means leaving a space for providing said gripping means protruding and extending beyond the support surface in the same plane as the support surface, Forcibly introducing a central portion of the locking means into said additional fastening means at the longitudinal ends of the two blades at their juxtaposed edges, said introduction of the locking means into the additional fastening means stiffening both the assembly of the two blades forming the support surface and the gripping means protruding and extending beyond said support surface, Inserting a hand in said space to grip the locking means each forming said gripping means, with a protruding portion, and raising the device transporting the person.

8. The method according to claim 7, wherein the first signal and the second signal are signals of different radio-frequency channels.

9. The method according to claim 7, wherein the first signal and the second signal are signals of a synchronization signal block (SSB) sent on different radio-frequency channels.

10. A communication apparatus, comprising:

an interface circuit, configured to receive a first signal from a radio-frequency channel, wherein the radio-frequency channel is separately connected to a first phase shifter and a second phase shifter, a destination antenna array of the first signal is an antenna array corresponding to the first phase shifter, the first phase shifter is a phase shifter with a dynamically adjustable phase, and the second phase shifter is a phase shifter with a fixed phase; and a processor, configured to send the first signal processed through a power bridge to the second phase shifter, wherein the interface circuit is further configured to receive a second signal, wherein a destination antenna array of the second signal is an antenna array corresponding to the second phase shifter; and the processor is configured to process the first signal and the second signal through the power bridge.

11. The communication apparatus according to claim 10, wherein the processor is configured to superimpose the first signal onto the second signal through the power bridge.

12. The communication apparatus according to claim 11, wherein the processor is configured to:

superimpose the first signal onto the second signal based on a baseband weight of the radio-frequency channel and a power bridge parameter of the power bridge.

13. The communication apparatus according to claim 10, wherein the radio-frequency channel comprises one of a common channel and a traffic channel.

14. The communication apparatus according to claim 11, wherein the processor is configured to:

superimpose the first signal onto the second signal through the power bridge so that a power of the first signal processed through the power bridge is aggregated to the radio-frequency channel of the second phase shifter.

15. The communication apparatus according to claim 11, wherein the processor is configured to:

superimpose the first signal onto the second signal through the power bridge so that a power of the first signal processed through the power bridge is aggregated to the radio-frequency channel of the second phase shifter, and a power of the first signal in the radio-frequency channel of the first phase shifter is zero.

16. The communication apparatus according to claim 11, wherein the interface circuit is configured to:

receive the first signal and the second signal simultaneously.

17. The communication apparatus according to claim 11, wherein the interface circuit is configured to:

receive the first signal and the second signal which are signals of different radio-frequency channels, or receive the first signal and the second signal which are signals of a synchronization signal block (SSB) sent on different radio-frequency channels.

18. A non-transitory computer-readable storage medium, wherein the computer-readable storage medium stores instructions executable by a computer to enable the computer to perform a method comprising:

receiving a first signal from a radio-frequency channel, wherein the radio-frequency channel is separately connected to a first phase shifter and a second phase shifter, a destination antenna array of the first signal is an antenna array corresponding to the first phase shifter, the first phase shifter is a phase shifter with a dynamically adjustable phase, and the second phase shifter is a phase shifter with a fixed phase; and sending the first signal processed through a power bridge to the second phase shifter, wherein the method further comprises:

receiving a second signal, wherein a destination antenna array of the second signal is an antenna array corresponding to the second phase shifter; and processing the first signal and the second signal through the power bridge.

19. The communication apparatus according to claim 10, wherein the communication apparatus comprises:

the first phase shifter;

the second phase shifter;

the power bridge;

the antenna array corresponding to the first phase shifter; and the antenna array corresponding to the second phase shifter.

20. The communication apparatus according to claim 19, wherein the communication apparatus is a base station.

* * * * *